US006731796B2

(12) United States Patent
Maltz et al.

(10) Patent No.: US 6,731,796 B2
(45) Date of Patent: May 4, 2004

(54) GRAPHICAL USER INTERFACE FOR COLOR TRANSFORMATION TABLE EDITING THAT AVOIDS REVERSAL ARTIFACTS

(75) Inventors: Martin S. Maltz, Rochester, NY (US); R. Victor Klassen, Webster, NY (US); Thyagarajan Balasubramanian, Webster, NY (US)

(73) Assignee: Xerox Corporation, Stamford, CT (US)

( * ) Notice: Subject to any disclaimer, the term of this patent is extended or adjusted under 35 U.S.C. 154(b) by 574 days.

(21) Appl. No.: 09/731,338

(22) Filed: Dec. 6, 2000

(65) Prior Publication Data

US 2002/0067847 A1 Jun. 6, 2002

(51) Int. Cl.[7] .................................................. G06K 9/00
(52) U.S. Cl. ...................................... 382/167; 382/260
(58) Field of Search ................................. 382/162, 167, 382/260, 282, 309; 345/593, 594, 604; 358/518, 523, 527

(56) References Cited

U.S. PATENT DOCUMENTS

| 5,257,097 A | * | 10/1993 | Pineau et al. ............... 358/527 |
| 5,596,510 A | * | 1/1997 | Boenke ....................... 358/523 |
| 5,644,509 A | | 7/1997 | Schwartz |
| 5,724,450 A | | 3/1998 | Chen et al. |
| 6,058,207 A | | 5/2000 | Tuijn et al. |
| 6,137,903 A | | 10/2000 | Dichter |

* cited by examiner

Primary Examiner—Phuoc Tran
(74) Attorney, Agent, or Firm—Fay, Sharpe, Fagan, Minnich & McKee, LLP

(57) ABSTRACT

A transformation function defines a relationship between a first color space and a second color space. The transformation function is edited by producing first and second outputs of an image in the first and second color spaces, respectively. The outputs are related in accordance with the transformation function. A portion of the first output, which corresponds to a portion of the second output including a color to be modified, is selected via a graphical user interface. A desired amount to modify the color is specified. A correction function is determined in accordance with the desired amount. The transformation table is edited in accordance with the monotonic correction function.

25 Claims, 3 Drawing Sheets

GRAPHICAL USER INTERFACE FOR COLOR TRANSFORMATION TABLE EDITING THAT AVOIDS REVERSAL ARTIFACTS

BACKGROUND OF THE INVENTION

The present invention relates to a system for editing transformation tables that are used to convert color values between different color spaces. It finds particular application in conjunction with converting color values between colorimetric and device dependent color spaces and will be described with particular reference thereto. It will be appreciated, however, that the invention is also amenable to other like applications.

Color signals or values produced by or for one device, such as a color scanner, often need to be output to or represented by another device, such as a printer or display, which may operate according to a different color space. In this case, the color signals must be transformed between the color spaces. The color signals are typically stored in a colorimetric color space (e.g., L*a*b* color space) and transformed into various device dependent color spaces (e.g., RGB, CMYK, etc). The transformation process between the various color spaces often includes interpolating values extracted from a transformation table, which represents the values of a multidimensional transformation function. Each entry in such a transformation table represents, for example, a CMYK value that should be used to print a color with a particular L*a*b*.

The characteristics of imaging devices, such as printers and displays, often change over time, so it is sometimes necessary to modify the transformation table to compensate for these changes. The transformation tables are also optimized for a generic image, so that it is sometimes necessary to change the transformation table to optimize the appearance of a particular image. For these, and many other reasons, it is sometimes necessary to modify the transformation table.

It is to be understood that if the transformation table is modified, the corresponding transformation function is modified accordingly. Furthermore, it is desirable to ensure that any modification made to the transformation table does not introduce irregularities (e.g., color reversals or non-monotonicities) into the corresponding function. Until now, it has not been possible to modify a color transformation table using a graphical user interface while preserving smooth, monotonic behavior in the corresponding transformation function.

The present invention provides a new and improved method and apparatus which overcomes the above-referenced problems and others.

SUMMARY OF THE INVENTION

A method for editing a transformation function, which defines a relationship between a first color space and a second color space, receives an image in the first color space and produces first and second outputs of the image in the second and a third color space, respectively. The first output is related to the image in accordance with the transformation function. A portion of the second output that corresponds to a portion of the first output including a color to be modified is selected via a graphical user interface. A desired amount to modify the color is specified. A correction function is determined in accordance with the desired amount. The transformation table is edited in accordance with the correction function.

In accordance with one aspect of the invention, the correction function is determined as a monotonic function.

In accordance with another aspect of the invention, noise is spatially filtered and/or satellites are discarded from the portion of the first output.

In accordance with another aspect of the invention, the first and second outputs are produced on a video display device and an output device, respectively. Furthermore, the selecting step includes sweeping an indicator across the video display device via the graphical user interface.

In accordance with another aspect of the invention, the specifying step includes indicating the desired amount via the graphical user interface.

In accordance with another aspect of the invention, the determining step includes calculating a potential correction function and determining if the potential correction function is monotonic. If the potential correction function is non-monotonic, the potential correction function is scaled according to a weighting function to make the potential correction function monotonic and the potential correction function is assigned as the correction function.

In accordance with a more limited aspect of the invention, the step of determining if the potential correction function is monotonic includes determining $\partial V_{2i}/\partial V_{1j} = \delta_{ij} + \alpha^* D_i^* \partial f(U)/\partial U_j$, where $f(U)$=the weighting function, $V_2 = V_1 + f(U)^* D$ is the correction function, $U = \alpha^*(V_1 - V_0)$, $V_1$=the color in the first color space, $V_0$=a center of the region to be modified, D=the desired color shift in the center of this region, $V_2$=the corrected color in the first color space, and $\alpha$=a scaling factor.

In accordance with a more limited aspect of the invention, the editing step includes ensuring a sampling in the table is sufficient to preserve an adequately sampled representation of the weighting function.

In accordance with a more limited aspect of the invention, the ensuring step includes checking if a distance D' between the current adjustment point $V_0$ and any previous adjustment points is greater than a predetermined threshold $T_1$. If the distance D' is greater than the threshold $T_1$, a check is made to determine if the weighting function $f(U)$ at a table node nearest to $V_0$ is greater than a predetermined threshold $T_2$. If the weighting function $f(U)$ at the table node nearest to $V_0$ is greater than the predetermined threshold $T_2$, the table in a vicinity of $V_0$ is modified to ensure an adequate representation of the weighting function.

In accordance with a more limited aspect of the invention, the editing step includes changing the scaling factor $\alpha$ until $f(U)$ at the table node nearest to $V_0$ is less than $T_2$.

In accordance with a more limited aspect of the invention, the editing step includes resampling the table nodes to have finer sampling in the vicinity of $V_0$.

In accordance with another aspect of the invention, the second output is produced via a digital output device and a corrected second output is produced via the digital output device.

One advantage of the present invention is that it modifies color transformation tables while preserving smooth, monotonic behavior.

Another advantage of the present invention is that it uses an average color for a region.

Another advantage of the present invention is that it samples a transformation table to accurately capture modifications made in the transformation function so that the system response is modified in a smooth manner.

Another advantage of the present invention is that it may permanently modify an output device's profile.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
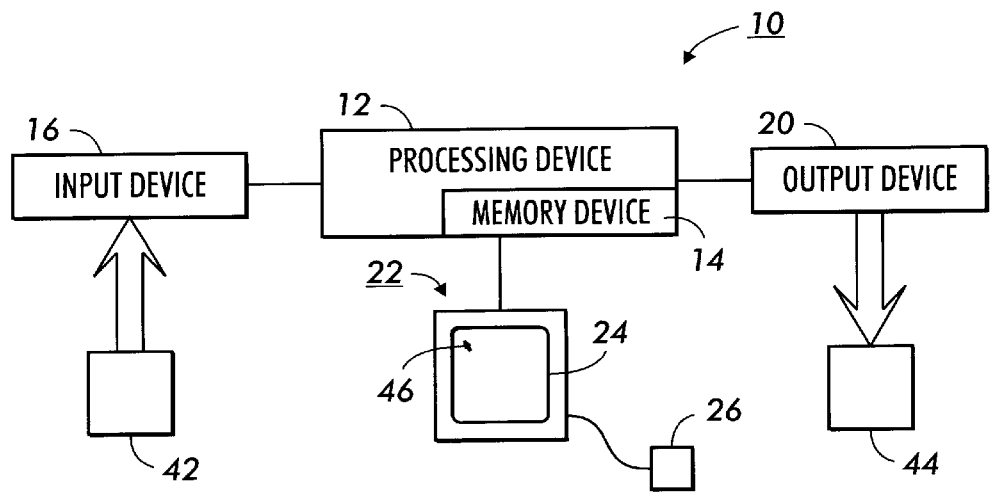
FIG. 1 illustrates a system for editing a transformation table according to the present invention.

With reference to FIG. 1, a system 10 for editing a transformation table includes a processing device 12, which communicates with a memory device 14. In the preferred embodiment, the memory device 14 is included within the processing device 12; however, other embodiments, in which the memory device 14 is not included within the processing device 12, are also contemplated. An input device 16 (e.g., a scanning device) and an output device 20 (e.g., a printing device) each communicates with the processing device 12. It is to be understood that the scanning device is preferably a digital scanner that is capable of inputting a color image. Similarly, it is to be understood that the output device is preferably operated within a xerographic environment; alternatively, the output device is a digital printer that is capable of producing a color image. A graphical user interface 22, which communicates with the processing device 12, includes a display (output) device 24 (e.g., a video display device) and a pointing device 26 (e.g., a mouse). The pointing device 26 permits a user to select portions of an image displayed on the display device 24.

Figure 2:
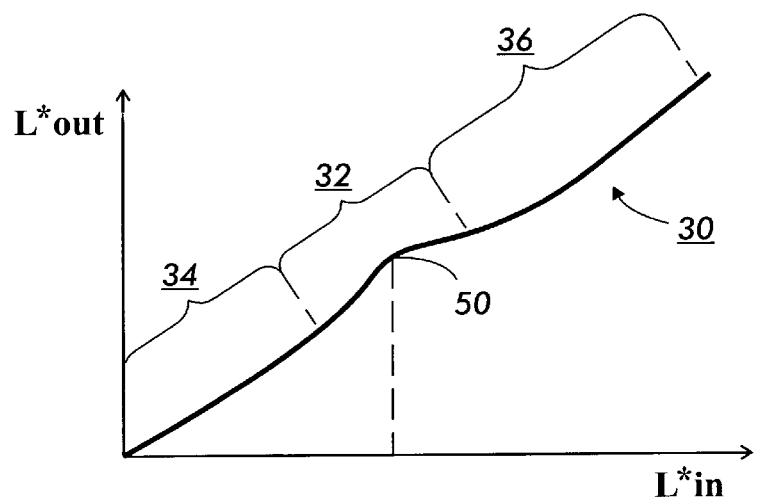
FIG. 2 illustrates a correction unction according to the present invention.

FIG. 2 illustrates a correction function 30 used to modify the system response. If the transformation table to be modified transforms L*a*b* to CMYK, this correction function would transform uncorrected L*a*b* to corrected L*a*b*. The corrected L*a*b* would then be transformed using the L*a*b* to CMYK table to obtain corrected CMYK. Both transforms could then be combined into a single table that gives the same results using well known techniques.

In general, the modification would only be applied in a limited region of L*a*b* space. It is difficult to represent such multidimensional transforms on a two dimensional sheet of paper, so FIG. 2 just shows the relationship between uncorrected (L*in) and corrected (L*out) L* along a line parallel to the L* axis of L*a*b* space, and going through the center of the modified region of L*a*b* space. Portions (see, for example, portions 34, 36) of the color space that are not to be corrected produce a corrected color that is substantially identical to the input color. This relationship is a function of a* and b* as well. For a*b* values far from the modified region, L*out would equal L*in for all L*. In this manner, an L*a*b* value is corrected in the desired fashion. It is to be noted that the correction curve is monotonic and, therefore, does not produce color reversals for color sweeps along the illustrated path in color space (a sweep of varying L* and constant a* and b* that goes through the center of the modified region of color space). A more complete analysis is required to make sure that there are no color reversals along all other sweeps. This analysis will be presented below.

Figure 3:
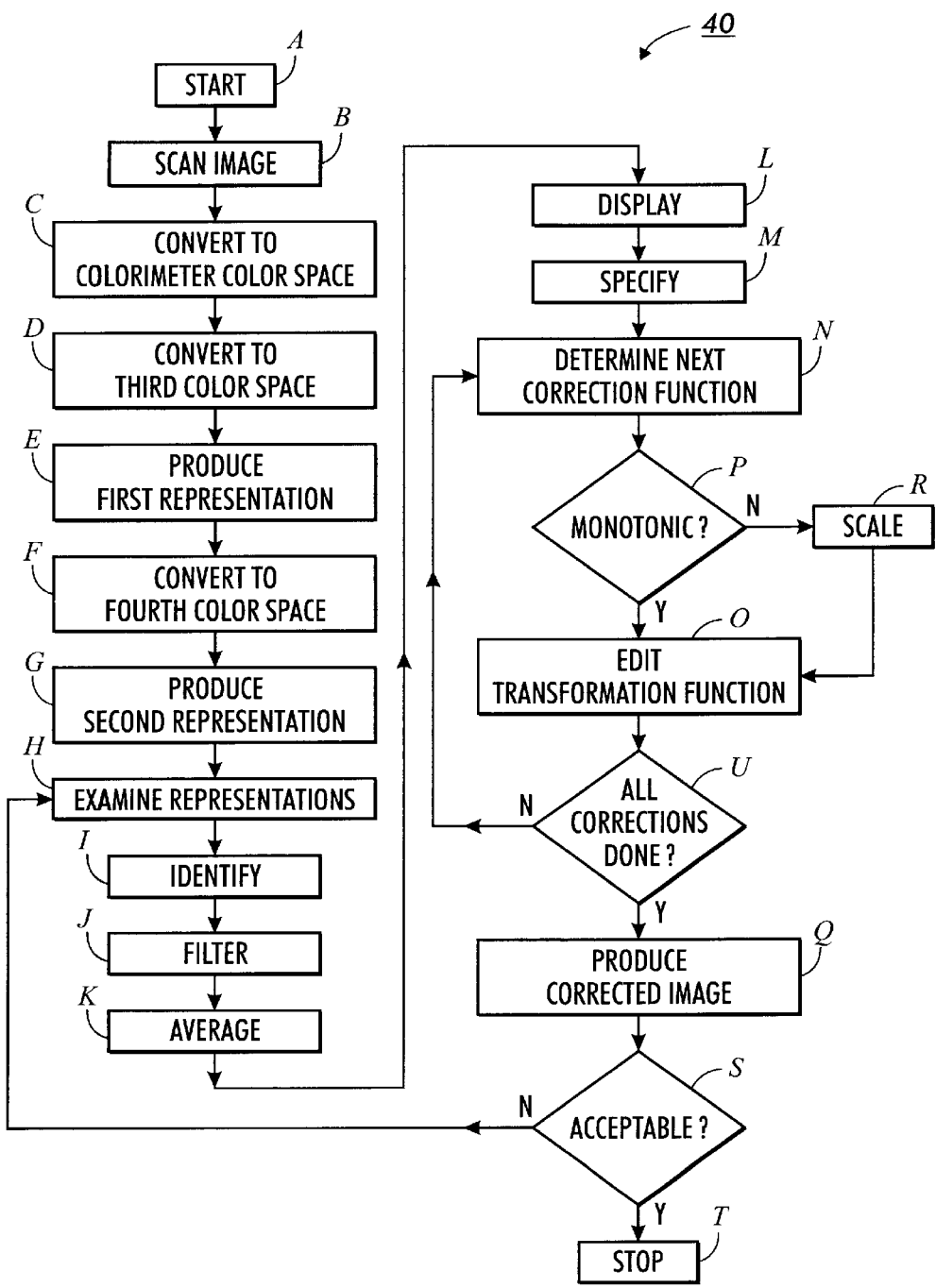
FIG. 3 illustrates a flowchart for editing a transformation table according to the present invention.

With reference to FIGS. 1–3, a method 40 for editing a transformation function (transformation table), which defines a relationship between a first color space and a second color space by creating the correction function 30, begins in a step A. An image 42 is scanned into the memory device 14, via the scanning device 16, in a step B. As discussed above, the input device 16 may operate in the first color space (e.g., the CMYK device dependent color space). Data representing the scanned image is converted, in a step C, from the first color space (e.g., the device dependent color space) into a second color space (e.g., a calorimetric color space such as L*a*b*). The colorimetric data is transformed, in a step D, into a third color space (e.g., the RGB device dependent color space), which is compatible with the video display device 24. A first representation of the image 42 is produced, in a step E, on the video display device 24. The colorimetric data is transformed, in a step F, into a fourth color space (e.g., CMYK), which is compatible with the output device 20. Then, in a step G, a second representation of the image 42 is produced onto an output medium 44 via the output device 20.

Although four color spaces are discussed above, it is to be understood that two (2) or more of the color spaces may be the same and are related in accordance with the transformation function. For example, both the input device 16 and the video display device 24 may operate in the RGB device dependent color space while the output device 20 operates in the CMYK color space.

A user examines the first and second representations of the image 42 in a step H. Then, in a step I, the user identifies, via the pointing device 26, a portion of the first representation of the image 42 that corresponds to a portion of the second representation of the image 42 that includes colors to be modified. In the preferred embodiment, the user sweeps an indicator 46 (cursor), via the pointing device 26, across the portion of the first representation of the image 42 including the colors to be modified. For example, the user may desire to make the green portion of the color space produced by the output device 20 greener and/or make the yellows less orange. Therefore, the user identifies a portion of the second representation that includes the color(s) to be modified and, using the pointing device 26, selects the corresponding portion of the image in the first representation.

The identified portion of the image is filtered in a step J. More specifically, the colors are spatially filtered (e.g., low pass, median, etc.) to remove noise. Furthermore, satellites (e.g., small regions of a color different from the identified color) are removed. It is to be understood that the filtering is performed in accordance with well-known filtering techniques. Optionally, the filtered colors within the region are averaged to produce a single color to be modified. The color(s) to be modified is/are displayed in a step L.

The user specifies, in a step M, a desired amount to modify the filtered color(s). It is to be understood that the amount the filtered color is to be modified is preferably specified using the pointing device 26. More specifically, a color space scale may be displayed on the video device 24 so that the user may "grab" the color to be modified using the pointing device 26. Then, the user moves the color along the scale, via the pointing device 26, until the desired resulting color is displayed. If the user desires to modify a plurality of colors (e.g., a green and the yellows within the second representation of the image), the user specifies the respective amounts to modify the colors sequentially. More specifically, the user first specifies the amount to modify the green color; then the user specifies the amount to modify the yellows.

As will be discussed in more detail below, a monotonic correction function (see the correction function 30 in FIG. 2) is determined next. In a step N a weighting function is determined from the range chosen for a single region of color space (i.e. the range of greens selected, or the range of yellows). Although the user may only specify modifying a single color, it is typically desirable to modify a plurality of colors surrounding the selected color. For example, as shown in the correction function 30, the color identified in the step I may be illustrated as a point 50. In the preferred embodiment, colors in the range 32 of including the identified color 50 are also modified, but to a lesser extent. To produce this result, the weighting function is set equal to 1.0 at the center of the region to be modified, and goes smoothly to zero outside this region. The correction function is then determined by multiplying the color modification desired by the user (a vector in L*a*b* color space) by the weighting function and adding it to an identity correction function (L*out=L*in; a*out=a*in; b*out=b*in). A determination is made, in a step P, if the correction function is monotonic. If the correction function is monotonic, control passes to a step O. Otherwise, control passes to a step R for scaling the weighting function to make the correction function monotonic; then control returns to the step O.

In step O, the transformation table is edited in accordance with the monotonic correction function to produce a new transformation table. The steps N, P, O, and optionally R are then repeated for any other modifications specified by the user in step M until they all have been processed.

In one embodiment, the editing step O includes ensuring that the sampling in the table is sufficient for an accurate representation of the transformation. For example, a check may be performed to determine if a distance D' between a current adjustment point $V_0$ (discussed below) and any previous adjustment point is greater than a predetermined threshold $T_1$. If the distance D' is greater than the predetermined threshold $T_1$, a check is made to determine if the weighting function $f(U)$ (see below) at a table node nearest to $V_0$ is greater than a predetermined threshold $T_2$. If the weighting function $f(U)$ is less than the predetermined threshold $T_2$, the table is modified in a vicinity of $V_0$ to ensure an adequately accurate representation of the correction function. It is to be understood that the editing step may include changing a scaling factor $\alpha$ (see below) until $f(U)$ at the table node nearest to $V_0$ is greater than $T_2$; alternatively editing step may include resampling the table nodes to have finer sampling in the vicinity of $V_0$.

A corrected representation of the image 42 is next produced, in the step Q, using the output device 20, which reflects the desired amount of modifications to the color(s). The user determines, in a step S, if the corrected image is acceptable. If the corrected image is acceptable, control passes to a step T for stopping the process; otherwise, control returns to the step H.

In the preferred embodiment, a potential weighting function is defined as a single three-dimensional function (e.g., a Gaussian (or similar) function) with different spreads along the three (3) axes. A mean value is set at the centroid of the selected colors. The potential weighting function is defined as $f(U)$, where $U=\alpha^*(V_1-V_0)$, $V_1$ is a color in a suitable color space (e.g., L*a*b*), $V_0$ is the filtered color resulting after the step K and represents the center of the region to be modified, and $\alpha$ is a scaling factor. Initially, the scaling factor $\alpha$ is 1; however, the scaling factor $\alpha$ may be changed, if necessary, in the step R to prevent color reversals (non-monotonicities).

As discussed above, the color representing $V_0$ is displayed on the video display device 24 and the pointing device 26 is used to identify a desired color to be substituted for $V_0$. New entries in the corrected transformation table are calculated according to the correction function:

$$V_2 = V_1 + f(U)^*D,$$

where:
$V_1$=the original color;
$V_2$=the modified color (i.e., the corrected color in the first color space); and
D=the difference between $V_0$ and the desired rendering (e.g., the desired color shift in the center of this region).

To explore whether $V_2$ is a monotonic function, a Jacobian is calculated, in the step P, as:

$$\partial V_{2i}/\partial V_{1j} = \delta_{ij} + \alpha^* D_i^* \partial f(U)/\partial U_j,$$

where:
$\partial V_{2i}$=the partial derivative of the $i^{th}$ dimension (e.g., L*, a* or b*) of the modified color $V_2$;
$\partial V_{1j}$=the partial derivative of the $j^{th}$ dimension (e.g., L*, a* or b*) of the original color $V_1$;
$D_i$=the difference between $V_0$ and the desired rendering in the $i^{th}$ dimension;
$\delta_{ij}$=a Kroniker delta which is 0 if i≠j and 1 if i=j; and
$\partial U_j$=the partial derivative of U in the $j^{th}$ dimension.

Figure 4:
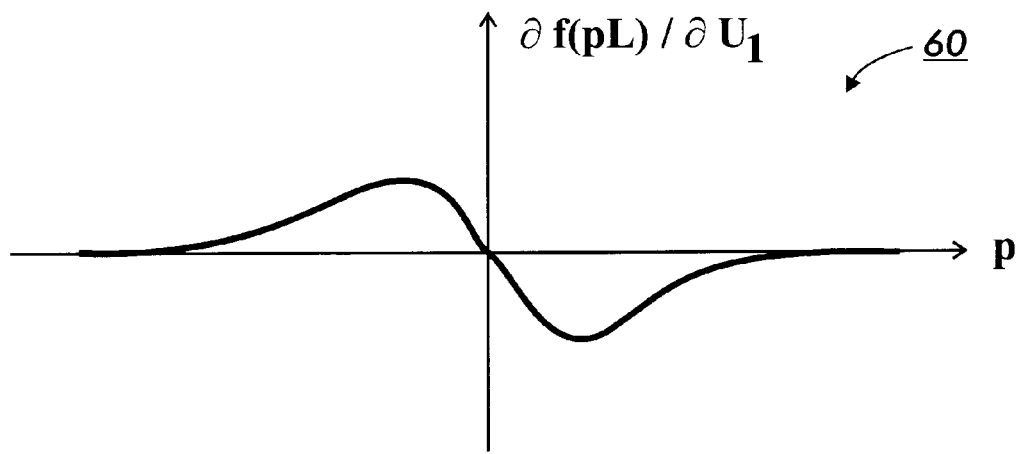
FIG. 4 illustrates a function showing the derivative of a weighting function along any vector passing through the origin.

Since the weighting function is chosen to reach a maximum of 1.0 at its origin (U=0) and to fall off smoothly to 0 as a function of a distance from the origin at U=0, the derivative along any vector L that goes through the origin is represented by the function 60 shown in FIG. 4, where p represents a position along the vector L.

From FIG. 4 it can be seen that the cross derivatives ($\partial V_{2i}$, $\partial V_{1j}$, where i≠j) always have both positive and negative regions and, therefore, are not used for distinguishing between monotonic and non-monotonic renderings. It is clear that if the diagonal derivatives ($\partial V_{2i}/\partial V_{1i}$) are negative, the modified rendering is non-monotonic. This leads to a criterion for a for monotonic behavior:

$$\alpha \leftarrow (D_1^* \min_L [\partial f(U)/\partial U_i])^{-1} \text{ when } D_i > 0; \text{ and}$$
$$\alpha \leftarrow (D_i^* \max_L [\partial f(U)/\partial U_i])^{-1} \text{ when } D_i < 0,$$

where the minimum value of the partial derivative is the most negative value, the maximum value of the partial derivative is the most positive value, and a must be small enough to satisfy the inequality for all three (3) dimensions. If the maximum value of $\alpha$ as determined above is <1, the rendering must be produced with the reduced value of $\alpha$ to avoid non-monotonic behavior.

If the potential weighting function is determined to be non-monotonic, the scaling factor $\alpha$ is adjusted until a monotonic potential weighting function is achieved. Once a monotonic potential weighting function is achieved, the potential weighting function is assigned as the (final) weighting function.

In the preferred embodiment, multiple color adjustments are applied sequentially. In other words, two (2) strong displacements in opposite directions at nearby points in color space substantially cancel each other. It is deemed preferable to cancel such opposite displacements rather than producing the requested rendering table, which would probably be very non-monotonic and lead to objectionable contours.

Multiple color adjustments are preferably folded into the rendering table in the sequence in which the user performed the adjustments. If a large table is used with constant node sampling, at the $i^{th}$ adjustment step, the L*a*b* values at each of the table nodes is mapped through the correction function to get a corrected L*a*b* value. This corrected L*a*b* value is then mapped through the transformation (rendering) table (representing adjustments 1, . . . , i-1), to get a corrected output value, and the corrected output values are inserted at the same node locations. In the adaptive node sampling approach, the optimal sampling is first found for the composite correction using one of a plurality of methods described in more detail below. Then, the L*a*b* nodes are mapped through the entire sequence of i correction functions. The $i^{th}$ correction function may be evaluated in its original functional form, or may itself be stored in a temporary three-dimensional table and approximated by three-dimensional interpolation.

Also, the values in the rendering table must be kept within range (e.g., 0<L*<100). Since the most commonly modified colors will probably have moderate L* values, keeping L* within range is not typically a problem. However, if L* is out-of-range, soft clamping techniques, like those used in the soft ink limit algorithm, may be used. In this approach, the rate at which the output L* goes to 0 and 100 approaches 0 as the input L* approaches 0 and 100 respectively. This eliminates discontinuities in slope produced by hard clamping techniques.

Additionally, an important issue is the size and node sampling in the rendering table. Both these parameters are chosen such that the weighting function is approximated with adequate accuracy. In the preferred embodiment, the weighting function and/or the node sampling are adapted to obtain the accuracy desired, which may be accomplished in one of several ways. For example, a check may be performed to determine if the current adjustment point $V_0$ is close to any previous adjustment points in the color space. If the current adjustment point $V_0$ is close to any previous adjustment points, the current node sampling is assumed to be sufficient for the current adjustment; otherwise the weighting function $f(U)$ is evaluated at the table node nearest to $V_0$. If the weighting function $f(U)$ evaluated at the table node nearest to $V_0$ is less than a threshold T, the adjustment is not adequately approximated by linear interpolation in the table. Therefore, the weighting parameter $\alpha$ is adjusted to increase the footprint of the weighting function $f(U)$ or the lookup table sampling is changed. Changing the lookup table sampling may be done by adding a node level passing through $V_0$ in each dimension, or by re-sampling the existing nodes according to a curvature estimate. Simple curvature estimates may be made by passing linear sweeps through the cascade of correction functions and computing partial $2^{nd}$ derivatives of the output sweeps.

An alternative approach for approximating the weighting function with sufficient accuracy is to use a table size large enough to adequately capture the vast majority of user adjustments (e.g., 32×32×32).

The modifications to the color table may be permanently stored in profile of the output device 20 or temporarily stored in memory device 14 to be used for a single image. Therefore, the modifications may serve either as a mechanism for improving a problem image or as a mechanism for improving the behavior of the output device 20. For example, the user may notice that the output device 20 produces certain colors "wrong" (e.g., in a manner not preferred). In this case, the user need only find an example of a page that was mis-rendered. Then, by modifying the color conversion of the objectionable portion of the mis-rendered page, change the behavior of the output device 20.

In an alternate embodiment, the weighting function is determined as the sum of Gaussian functions centered around each color that is part of the region to be modified. Then, the sum of the Gaussian functions is normalized so that the maximum value of the weighting function is 1.0.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method for editing a transformation table, which defines a relationship between a first color space and a second color space, the method comprising:

receiving an image in the first color space and producing first and second outputs of the image in the second and a third color space, respectively, the second output being related to the image in accordance with the transformation function;

selecting, via a graphical user interface, a portion of the first output that corresponds to a portion of the second output including a color to be modified;

specifying a desired amount to modify said color;

determining a correction function in accordance with the desired amount; and editing the transformation table in accordance with the correction function.

2. The method for editing a transformation table as set forth in claim 1, wherein said determining step includes:

determining a monotonic correction function.

3. The method for editing a transformation table as set forth in claim 1, further including at least one of:

spatially filtering the portion of the first output to remove noise; and discarding satellites from the portion of the first output.

4. The method for editing a transformation table as set forth in claim 1, wherein the first and second outputs are produced on a video display device and an output device, respectively, the selecting step including:

sweeping an indicator across the video display device, via the graphical user interface.

5. The method for editing a transformation table as set forth in claim 1, wherein the specifying step includes:

indicating the desired amount via the graphical user interface.

6. The method for editing a transformation table as set forth in claim 1, wherein the determining step includes:

calculating a potential correction function;

determining if the potential correction function is monotonic;

if the potential correction function is non-monotonic, scaling the potential correction function according to a weighting function to make the correction function monotonic; and assigning the potential correction function as the correction function.

7. The method for editing a transformation table as set forth in claim 6, wherein the step of determining if the potential correction function is monotonic includes:

determining $\partial V_{2i}/\partial V_{1j}=\delta_{ij}+\alpha^*D_i^*\partial f(U)/\partial U_j$, where:

$f(U)$=the weighting function;

$V_2$=a corrected color in the first color space;

$V_2=V_1+f(U)^*D$ and is the correction function;

D=a desired color shift in a center of a region to be modified;

$U=\alpha^*(V_1-V_0)$;

$V_1$=the color in the first color space;

$V_0$=the center of the region to be modified; and $\alpha$=a scaling factor.

8. The method for editing a transformation table as set forth in claim 7, wherein the editing step includes:

ensuring a sampling in the table is sufficient for an accurate representation of the transformation.

9. The method for editing a transformation table as set forth in claim 8, wherein the ensuring step includes:

checking if a distance D' between the current adjustment point $V_0$ and any previous adjustment point is greater than a predetermined threshold $T_1$;

if the distance D' is greater than the threshold $T_1$, checking if the weighting function $f(U)$ at a table node nearest to $V_0$ is greater than a predetermined threshold $T_2$; and if the weighting function $f(U)$ at the table node nearest to $V_0$ is less than the predetermined threshold $T_2$, modifying the table in a vicinity of $V_0$ to ensure the accurate representation of the transformation.

10. The method for editing a transformation table as set forth in claim 9, wherein the editing step includes:

changing the scaling factor $\alpha$ until $f(U)$ at the table node nearest to $V_0$ is greater than $T_2$.

11. The method for editing a transformation table as set forth in claim 9, wherein the editing step includes:

resampling the table nodes to have finer sampling in the vicinity of $V_0$.

12. The method for editing a transformation table as set forth in claim 1, wherein the second output is produced via a digital output device, the method further including:

producing a corrected second output via the digital output device.

13. A system for editing a transformation function, which defines a relationship between a first color space and a second color space, comprising:

a memory device for storing the transformation function;

first and second output devices for producing first and second outputs of an image in the second and a third color space, respectively, the outputs being related in accordance with the transformation function;

a graphical user interface for a) selecting a portion of the first output that corresponds to a portion of the second output including a color to be modified, and b) specifying a desired amount to modify the color; and a processing device for determining a correction function in accordance with the desired amount and editing the transformation function in accordance with the correction function.

14. The system for editing a transformation function as set forth in claim 13, wherein the correction function is monotonic.

15. The system for editing a transformation function as set forth in claim 13, wherein the processing device at least one of spatially filters the portion of the first output to remove noise and discards satellites from the portion of the first output.

16. The system for editing a transformation function as set forth in claim 13, wherein:

the first and second outputs are a video display device and an digital output device, respectively; and the graphical user interface includes an indicator, which is swept across the video display device for selecting the portion of the first output.

17. The system for editing a transformation function as set forth in claim 13, wherein the processing device calculates a potential correction function, ensures the potential correction function is monotonic via a scaling function, and assigns the potential correction function as the correction function.

18. The system for editing a transformation function as set forth in claim 17, wherein the processing device determines if the potential correction function is monotonic as a function of $\partial V_{2i}/\partial V_{1j}=\partial_{ij}+\alpha^*D_i^*\partial f(U)/\partial U_j$, where:

$f(U)$=the weighting function;

$V_2$=a corrected color in the first color space;

$V_2=V_1+f(U)^*D$ and is the correction function;

D=a desired color shift in a center of a region to be modified;

$U=\alpha^*(V_1-V_0)$;

$V_1$=the color in the first color space;

$V_0$=the center of the region to be modified; and $\alpha$=a scaling factor.

19. The system for editing a transformation function as set forth in claim 13, wherein the second output device includes a digital printing device.

20. A method for modifying a color included in a representation of an image, the method comprising:

scanning the image into an input device;

transforming, as a function of a transformation table, data representing the image in a color space of the input device to a colorimetric color space;

storing the calorimetric color space data in a memory device;

transforming, as a function of the transformation table, the calorimetric color space data to respective device dependent color spaces for first and second output devices;

producing first and second representations of the image via the first and second output devices;

identifying, via a graphical user interface, a portion of the first representation including a color to be modified in the second representation;

specifying, via the graphical user interface, an amount the color is to be modified in the second representation;

determining a correction function, which modifies a range of colors in the device dependent color spaces, in accordance with the amount the color is to be modified;

editing the transformation table in accordance with the correction function; and producing a modified second representation of the image, via the second output device, as a function of the edited transformation table.

21. The method for modifying a color as set forth in claim 20, wherein the determining step includes:

determining a monotonic correction function.

22. The method for modifying a color as set forth in claim 20, further including:

filtering the color to be modified from a plurality of colors included within the portion of the first representation.

23. The method for modifying a color as set forth in claim 22, wherein the filtering step includes:

averaging the plurality of colors to determine the color to be modified.

24. The method for modifying a color as set forth in claim 20, further including:

determining if the edited transformation table is monotonic; and if the edited transformation table is non-monotonic, scaling the weighting function until the edited transformation table becomes monotonic.

25. The method for modifying a color as set forth in claim 20, wherein the second output device is a xerographic printing device, further including:

if the modified second representation of the image is unacceptable, repeating the steps of specifying, determining, and editing and producing a corrected modified second representation of the image.

* * * * *